(12) United States Patent
Watanabe (10) Patent No.: US 8,393,671 B2
(45) Date of Patent: Mar. 12, 2013

(54) STEERING SUPPORT FRAME

(75) Inventor: Daisuke Watanabe, Soja (JP)

(73) Assignee: Asteer Co., Ltd., Okayama (JP)

( * ) Notice: Subject to any disclaimer, the term of this patent is extended or adjusted under 35 U.S.C. 154(b) by 173 days.

(21) Appl. No.: 13/102,847

(22) Filed: May 6, 2011

(65) Prior Publication Data

US 2011/0254316 A1 Oct. 20, 2011

(51) Int. Cl.
*B62D 25/14* (2006.01)
(52) U.S. Cl. ..................... 296/193.02; 296/72
(58) Field of Classification Search ............ 296/193.02, 296/203.02, 70, 72; 280/779; 180/90
See application file for complete search history.

(56) References Cited

U.S. PATENT DOCUMENTS

| | | | | |
|---|---|---|---|---|
| 5,387,023 A * | 2/1995 | Deneau | | 296/72 |
| 7,152,295 B2 * | 12/2006 | Goetz et al. | | 29/434 |
| 7,407,221 B2 * | 8/2008 | Kring et al. | | 296/193.02 |
| 7,810,874 B2 * | 10/2010 | Vican et al. | | 296/193.02 |
| 8,100,463 B2 * | 1/2012 | Penner et al. | | 296/193.02 |
| 8,322,781 B2 * | 12/2012 | Angenheister et al. | .. | 296/193.02 |
| 2002/0008399 A1 * | 1/2002 | Yasuta et al. | | 296/72 |
| 2010/0001552 A1 * | 1/2010 | Kim | | 296/193.02 |
| 2011/0254316 A1 * | 10/2011 | Watanabe | | 296/193.02 |
| 2012/0049574 A1 * | 3/2012 | Atsumi et al. | | 296/193.02 |

FOREIGN PATENT DOCUMENTS

| | | |
|---|---|---|
| JP | 3778762 B | 5/2006 |
| JP | 2006-199050 A | 8/2006 |

* cited by examiner

*Primary Examiner* — Glenn Dayoan
*Assistant Examiner* — Gregory Blankenship
(74) *Attorney, Agent, or Firm* — DLA Piper LLP (US)

(57) ABSTRACT

The present invention provides a steering support frame composed of a deck cross member and fastening brackets attached to right and left ends of the deck cross member, and structured by fastening the fastening brackets to respective fitting parts provided in right and left vehicle body frames so as to bridge the deck cross member between the right and left vehicle body frames. To connect the deck cross member and the fastening brackets, one of the ends of the deck cross member is welded to both of a body plate and a surface contact plate of the fastening bracket on a driver seat side, and the other end of the deck cross member is welded only to a body plate of the fastening bracket on a passenger seat side, whereby the deck cross member has a strength difference between the driver seat and passenger seat sides.

3 Claims, 9 Drawing Sheets

STEERING SUPPORT FRAME

BACKGROUND OF THE INVENTION

1. Field of the Invention

The present invention relates to a steering support frame composed of a deck cross member and fastening brackets attached to both right and left ends of the deck cross member, and structured by fastening the fastening brackets to respective fitting parts provided in right and left vehicle body frames so as to bridge the deck cross member between the right and left vehicle body frames.

2. Description of the Related Art

A steering support frame is structured of a deck cross member bridged between right and left vehicle frames. The deck cross member is fixed with bolting fastening brackets attached to respective right and left ends thereof with respect to fitting parts of the vehicle frames. In this context, there is no problem when a fastening bracket is surface contacted with the corresponding fitting part without a gap or a deviation therebetween. However, a gap inevitably exists between the fastening bracket and the fitting part. Furthermore, a positional deviation between the fastening nut and a bolt hole is inevitable. There is a problem in that the fastening bracket is deformed and strength (mechanical strength) is lowered when the fastening bracket is bolted to the fitting part in such a condition. A gap between the fastening bracket and the fitting part can be eliminated by interposing a spacer therebetween. However, a problem occurs that the number of parts and the number of steps are increased. In order to solve such a problem, there have been proposed fastening brackets disclosed in Japanese Patent No. 3778762 and Japanese Patent Application Publication No. 2006-199050.

In Japanese Patent No. 3778762, a gap with a fitting part is adjusted by providing a relative difference in strength of fastening brackets (cylindrical flange parts) attached to right and left ends of a deck cross member (frame). Specifically, a fastening bracket having higher strength is surface contacted with a vehicle body frame (pillar) for bolting and a fastening bracket having lower strength is deformed when used for bolting to the vehicle body frame. A deformation anticipated part that is elastically deformed or plastically deformed is disclosed as means for providing the relative difference in strength of the fastening brackets. For example, a crossing groove (groove part 5a) and a crossing hole (long hole 5b) formed between a boss (boss part 6) and a fastening nut (nut 8) for connecting a deck cross member are disclosed as specific examples of the deformation anticipated part (see FIG. 8 and FIG. 9 of Japanese Patent No. 3778762).

In Japanese Patent Application Publication No. 2006-199050, a dimensional adjustment deforming section 20 is formed to surround a fastening nut (project nut 11) in a fastening bracket (attachment mechanism 10) to be attached to each of the right and left ends of a deck cross member (steering member 1). Accordingly, the dimensional adjustment deforming section 20 is deformed towered a vehicle body frame (vehicle body side) to eliminate a gap between the fastening bracket and a fitting part. The dimensional adjustment deforming section 20 is formed by disposing a long hole (slit 20a) to surround the vicinity of a fastening nut (described as the "projection bolt 8" in the specification although considered as a misdescription of the "projection nut 11") (see FIG. 4 of Japanese Patent Application Publication No. 2006-199050).

Generally, the fastening bracket on the right end side is face contacted with the fitting part on the driver seat side and fixed with a bolt, and thereafter the deck cross member is fixed with a bolt while a gap is eliminated between the fastening bracket on the left end side and the fitting part on the passenger seat side. In other words, the fastening bracket on the right end side to be fixed to the fitting part on the driver seat side is not elastically deformed or plastically deformed. The fastening brackets described in Japanese Patent No. 3778762 and Japanese Patent Application Publication No. 2006-199050 are applied to the fitting part on the passenger seat side and adjust the gap through the elastic deformation or plastic deformation. The fastening brackets have an advantage in that the gap can be adjusted without interposing a spacer. However, there is a problem in that fastening brackets having different shapes are needed for the driver seat and passenger seat sides.

This requires two types of fastening brackets, which is a large restriction in reducing the manufacturing cost. Furthermore, different storage and handling procedures are required for different right and left fastening brackets, and the fastening brackets might be reversely attached to the ends of the deck cross member due to their resembling appearances.

An object of the invention is to provide a steering support frame in which common fastening brackets are used as right and left fastening brackets whose part including a fastening nut is elastically deformed or plastically deformed to adjust a gap with a fitting part.

SUMMARY OF THE INVENTION

The above-mentioned problems are solved by a steering support frame formed by fastening fastening brackets attached to both right and left ends of a deck cross member to respective fitting parts provided in vehicle body frames so as to bridge the deck cross member between the right and left vehicle body frames. Each of the fastening brackets includes a body plate to which one of the ends of the deck cross member is connected, a surface contact plate to which a fastening nut corresponding to a bolt to be inserted into corresponding one of the fitting parts of the vehicle body frames is fixed, the surface contact plate being provided in the body plate, a connection plate that is a part for connecting the body plate and the surface contact plate, the connection plate having a width in a direction perpendicular to a connecting direction of the body plate and the surface contact plate equal to or smaller than a width of the surface contact plate, and a portion defining a demarcating slit for demarcating the body plate and the surface contact plate. To connect the deck cross member and the fastening brackets, one of the ends of the deck cross member is welded to both of the body plate and the surface contact plate of the fastening bracket on a driver seat side, and the other end of the deck cross member is welded only to the body plate of the fastening bracket on a passenger seat side.

In the steering support frame according to the invention, the common right and left fastening brackets are used in which the surface contact plate to which the fixing nut is fixed is supported by the body plate only through the connection plate whose width in a direction perpendicular to the connecting direction of the body plate and surface contact plate is equal to or smaller than the width of the surface contact plate. One of the ends of the deck cross member is welded to the body plate and the surface contact plate of the fastening bracket on the driver seat side. On the other hand, the other end of the deck cross member is welded only to the body plate of the fastening bracket on the passenger seat side. This structure provides a strength difference between the right and left fastening brackets. The fastening bracket on the passenger seat side adjusts a gap between the surface contact plate and the fitting part through the elastic deformation or plastic deformation of the connection plate in a direction close to or apart from the fitting part of the frame, and also adjusts a positional deviation between the fastening nut fixed to the surface contact plate and a bolt hole through the elastic deformation or plastic deformation of the connection plate in a bending direction parallel to the fitting part.

When the deck cross member is a pipe with both ends having the same diameter (a straight pipe in general, but including a curved pipe bent in an extending direction and an offset pipe whose shaft line is out of alignment), and when the right and left fastening brackets are in a misaligned positional relationship, one of the ends can be welded to the body plate and the surface contact plate of the fastening bracket on the driver seat side, and the other end can be welded only to the body plate of the fastening bracket on the passenger seat side. However, the fastening brackets are generally in the same positional relationship on the right and left sides. Accordingly it is preferable that the fastening brackets be configured to include a pair of such surface contact plates having a point symmetric positional relationship, and that the deck cross member be a pipe with both ends having different diameters that has one end with an outer diameter equal to or larger than a minimum distance between the pair of surface contact plates provided to the fastening bracket on the driver seat side and the other end with an outer diameter smaller than a minimum distance between the pair of surface contact plates provided to the fastening bracket on the passenger seat side. The pipe with both ends having different diameters includes a pipe having different shapes on the right and left ends and a pipe having the same shape and different sizes on the right and left ends.

A straight pipe having a circular cross section is used for the deck cross member in many cases. Generally, in order to increase the strength of the driver seat side end, the diameter on the deriver seat side end is increased to increase section modules. In other words, the deck cross member is a pipe with both ends having different diameters that has the same circular shape but different outer diameters on the right and left ends. With the deck cross member that is a pipe with both ends having different diameters, one of its ends can be welded to the body plate and the surface contact plates of the fastening bracket on the driver seat side by forming the outer diameter on the driver seat side to be equal to or larger than the minimum distance between the pair of surface contact plates provided to the fastening bracket on the driver seat side. The other end can be welded only to the body plate of the fastening bracket on the passenger seat side by forming the outer diameter on the passenger seat side to be smaller than the minimum distance between the pair of surface contact plates provided to the fastening bracket on the passenger seat side.

To be more specific, it is preferable that, in each of the fastening brackets, the connection plate be provided on a side opposite to a connecting part of the body plate to which the end of the deck cross member is connected to have a positional relationship to sandwich the surface contact plate between the body plate and the connection plate. With respect to the fastening bracket on the driver seat side, the end of the deck cross member is welded to both of the body plate and the surface contact plate. With respect to the fastening bracket on the passenger seat side, the end of the deck cross member is welded only to the body plate. Accordingly, the position where the connection plate is provided is not specifically limited as for only the fastening bracket on the passenger seat side. This is because the elastic deformation or plastic deformation of the connection plate for adjusting a gap between the surface contact plate and the fitting part and adjusting a positional deviation between the fastening nut fixed to the surface contact plate and the bolt hole is not restrained on the passenger seat side. However, as for the connection plate of the fastening bracket on the driver seat side, when the connection plate is provided to have a positional relationship such that the surface contact plate is sandwiched between the body plate and the connection plate on the side opposite to the connecting part of the body plate and the end of the deck cross member is welded to the fastening bracket on the driver seat side, the connecting part and the connection plate are opposed to each other with the surface contact plate interposed therebetween, and the surface contact plate is restrained most firmly. As described above, since the right and left common fastening brackets are used according to the invention, it is preferable to dispose the connection plate as described above.

According to the invention, the connection plate which connects the surface contact plate and the body plate is elastically deformed or plastically deformed to adjust a gap between the surface contact plate and the fitting part and adjust a positional deviation between the fastening nut and the bolt hole. This advantageous effect is caused by connecting the surface contact plate and the body plate with the connection plate interposed therebetween that has a width perpendicular to the connecting direction of the body plate and the surface contact plate equal to or smaller than the width of the surface contact plate. With respect to the fastening bracket on the driver seat side, the end of the deck cross member is welded to both of the body plate and the surface contact plate. Furthermore, with respect to the fastening bracket on the passenger seat side, the end of the deck cross member is welded only to the body plate. This provides a strength difference between the right and left fastening brackets.

When the fastening bracket including the pair of surface contact plates having a point symmetric positional relationship is used and a pipe with both ends having different diameters (more preferably, a straight pipe with both ends having different diameters) is used as the deck cross member, it becomes easy that the end of the deck dross member is welded to the body plate and the surface contact plate of the fastening bracket on the driver seat side, and the end of the deck cross member is welded only to the body plate of the fastening bracket on the passenger seat side. Accordingly, the strength of the deck cross member is different on the right and left sides, and the total strength difference between the right and left sides as the steering sport frame, including the strength difference between the fastening brackets, is more apparent. Furthermore, by providing the connection plate on a side opposite to a connecting part of the body plate to which the end of the deck cross member is connected to have a positional relationship to sandwich the surface contact plate between the body plate and the connection plate, a restriction of the surface contact plate due to the welding of the end of deck cross member is further increased, and the strength difference between the right and left fastening brackets becomes more apparent.

DETAILED DESCRIPTION OF THE PREFERRED EMBODIMENTS

Figure 1:
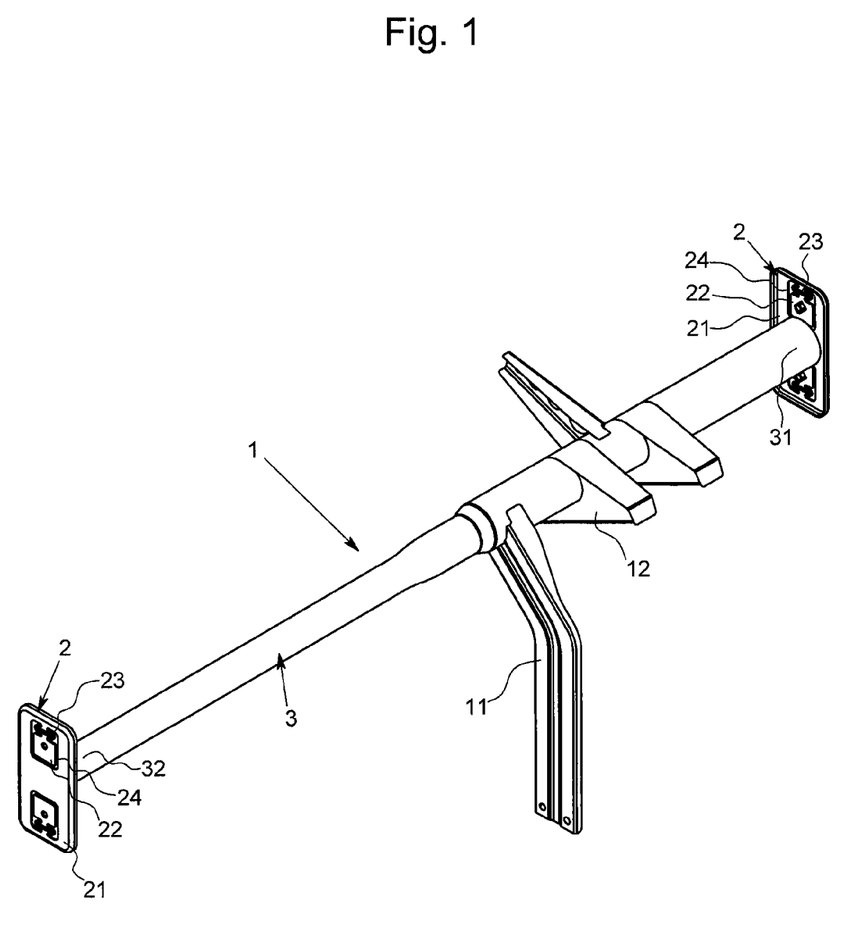
FIG. 1 is a perspective view of a steering support frame structured by using fastening brackets according to the invention as viewed from behind.
Figure 2:
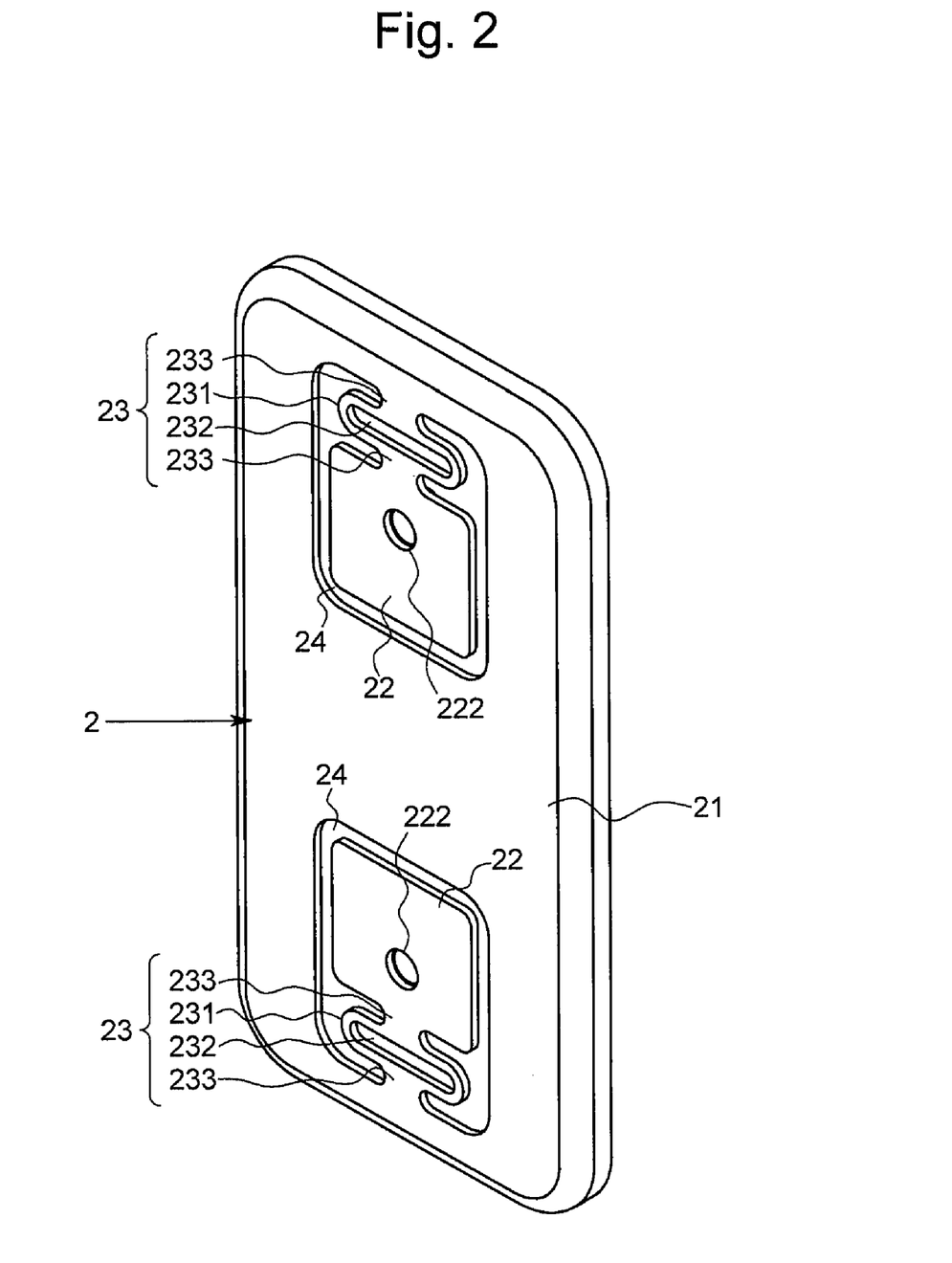
FIG. 2 is a perspective view of the fastening bracket on a passenger seat side as viewed from the left side.
Figure 3:
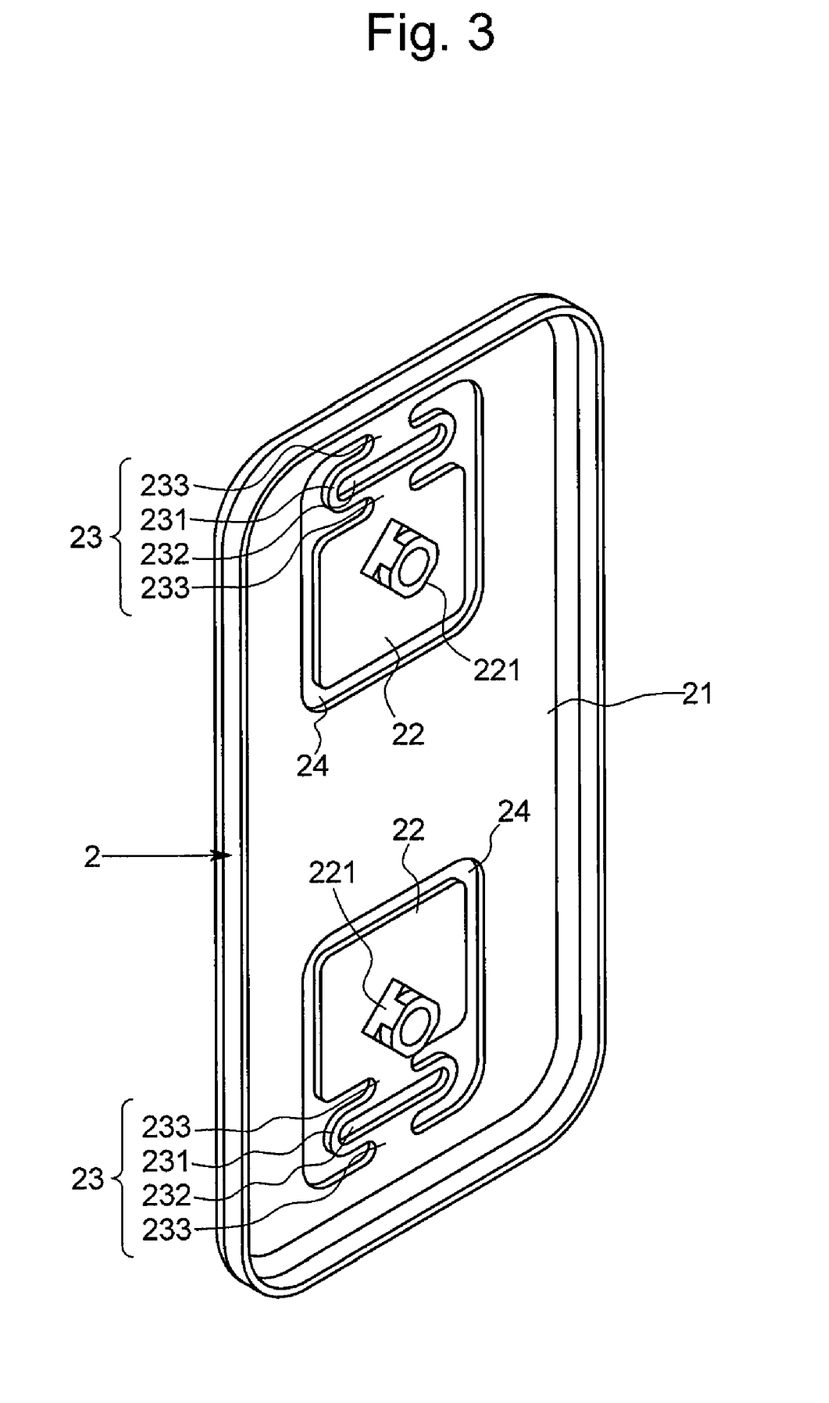
FIG. 3 is a perspective view of the fastening bracket on the passenger seat side as viewed from the right side.

Hereinafter, an embodiment of the present invention will be described with reference to the accompanying drawings. As illustrated in FIG. 1 for example, a steering support frame 1 according to the invention is structured by welding a fastening bracket 2 to each of a driver seat side end 31 and a passenger seat side end 32 of a deck cross member 3. The deck cross member 3 in this example is basically a metal straight pipe having a circular cross section and a pipe with both ends having different diameters that has a larger diameter on the driver seat side and a smaller diameter on the passenger seat side. An intermediate stay 11 and a column bracket 12 are attached on the driver seat side having a larger diameter. The fastening brackets 2 on the driver seat and passenger seat sides have exactly the same specifications (that is, common to the right and left sides). Since the deck cross member 3 is a pipe with both ends having different diameters, joint relationships between the driver seat side end 31 and the passenger seat side end 32 with respect to the respective fastening brackets 2 are different as described below. The difference of the joining relationships provides a strength difference between the right and left fastening brackets 2.

As illustrated in FIGS. 2 to 5, each fastening bracket 2 in this example includes a body plate 21 for connecting the passenger seat side end 32 of the deck cross member 3, a surface contact plate 22 to which a fastening nut 221 is fixed, a connection plate 23 whose width (in the horizontal direction in this example) perpendicular to the connecting direction of the body plate 21 and the surface contact plate 22 (in the vertical direction in this example) is equal to or smaller than the a width of the surface contact plate, and a demarcating slit 24 formed between the body plate 21 and the surface contact plate 22. The body plate 21 and the surface contact plate 22 are connected with the connection plate 23 interposed therebetween. The right and left fastening brackets 2 in this example are common members, and are jointed on the right and left ends, respectively, of the deck cross member 3 in mirror symmetry on both the driver seat and passenger seat sides (facing each other).

The body plate 21 forms a circular flange with its rim bent forward (rightward in FIG. 2 and toward the viewer of FIGS. 4 and 5), and is a plate member having a rectangular shape in front view with increased rigidity as a whole. A pair of surface contact plates are provided in vertical symmetry within a planer surface range surrounded by the circular flange. The body plate 21 is a basal member when the connection plate 23 is elastically deformed or plastically deformed. When the surface contact plate 22 is fastened to the vehicle body frame 4 on the passenger seat side, the body plate 21 is in a position fixed state with a gap to the vehicle body frame 4 (see FIG. 9). The body plate 21 is required to have sufficient rigidity so as not to be deformed to the connection plate 23 and to keep a planner shape. For this reason, the rigidity of the body plate 21 is increased by providing a circular flange at the rim as in this example or by forming beads in the plane to increase the section modulus aside from or in combination with the circular flange.

The surface contact plate 22 is a plate member having a square shape in front view whose periphery is surrounded by the demarcating slit 24 except the connection plate 23. Since the body plate 21, the surface contact plate 22, and the connection plate 23 (intermediate plate 231 and pair of cross linking plates 233) are structured by a piece of successive plate member, the plates are formed all at once by, for example, punching out the demarcating slit 24 and a deformation slit 232 during press working. Accordingly, in a stage where the connection plate 23 is not elastically deformed or plastically deformed, the body plate 21, the surface contact plate 22, and the connection plate 23 are positioned on the same plane. While the shape of the surface contact plate 22 in front view is not specifically limited, it is preferable that the surface contact plate 22 have a size large enough to be stably face contacted with the vehicle body frame 4.

Figure 9:
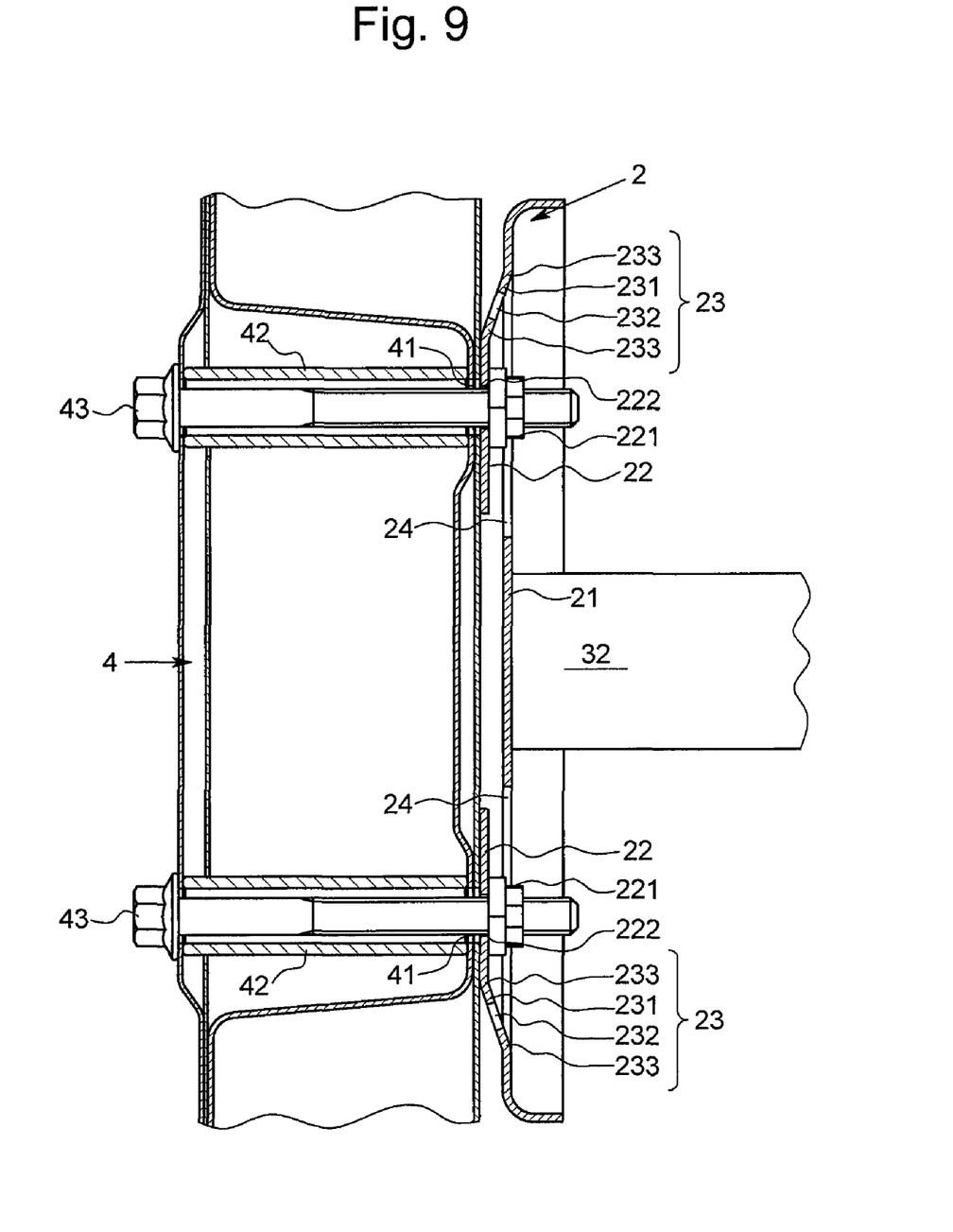
FIG. 9 is a vertical cross sectional view showing a state where the fastening bracket on the passenger seat side has been connected to the vehicle body frame.

The surface contact plate 22 in this example is face contacted with the vehicle body frame 4 by tightening bolts 43 to elastically deform or plastically deform the connection plate 23 (see FIG. 9). A though hole 222 is provided at a position closer to the cross linking plate 233 side from the center, in order that load generated by tightening of the bolt 43 can be applied at a position near the connection plate 23. The fastening nut 221 is fixed at the front side by welding so as to be communicated with the through hole 222. The through hole 222 is provided close to the cross linking plate 233 side, so that load generated by tightening of the bolt 43 can easily cause elastic deformation or plastic deformation of the connection plate 23, and buckling of the surface contact plate 22 caused by the connection plate 23 not elastically deformed or plastically deformed can be prevented. In order to prevent buckling of the surface contact plate 22, beads may be provided in the surface contact plate 22 to increase its rigidity.

The connection plate 23 includes an intermediate plate 231 having a long hole shape parallel to the sides of the surface contact plate 22 extending in the horizontal direction, and a pair of cross linking plates 233, 233 whose width is smaller than that of the surface contact plate 22 in the horizontal direction. The intermediate plate 231 is hollowed to provide the deformation slit 232 whose shape is similar to the outer shape of the intermediate plate 231. The connection plate 23 in this example is provided on the side opposite to the connecting part of the body plate 21 at which an end of the deck cross member 3 is connected to have a positional relationship to sandwich the surface contact plate 22 between the body plate 21 and the connection plate 23. This is to, as described below, distinguish a restrained condition (driver seat side end 31) and unrestrained condition (passenger seat side end 32) of the surface contact plate 22 by using the fastening brackets 2 having the same structure on the driver seat and passenger seat sides (see FIGS. 4 and 5).

Figure 4:
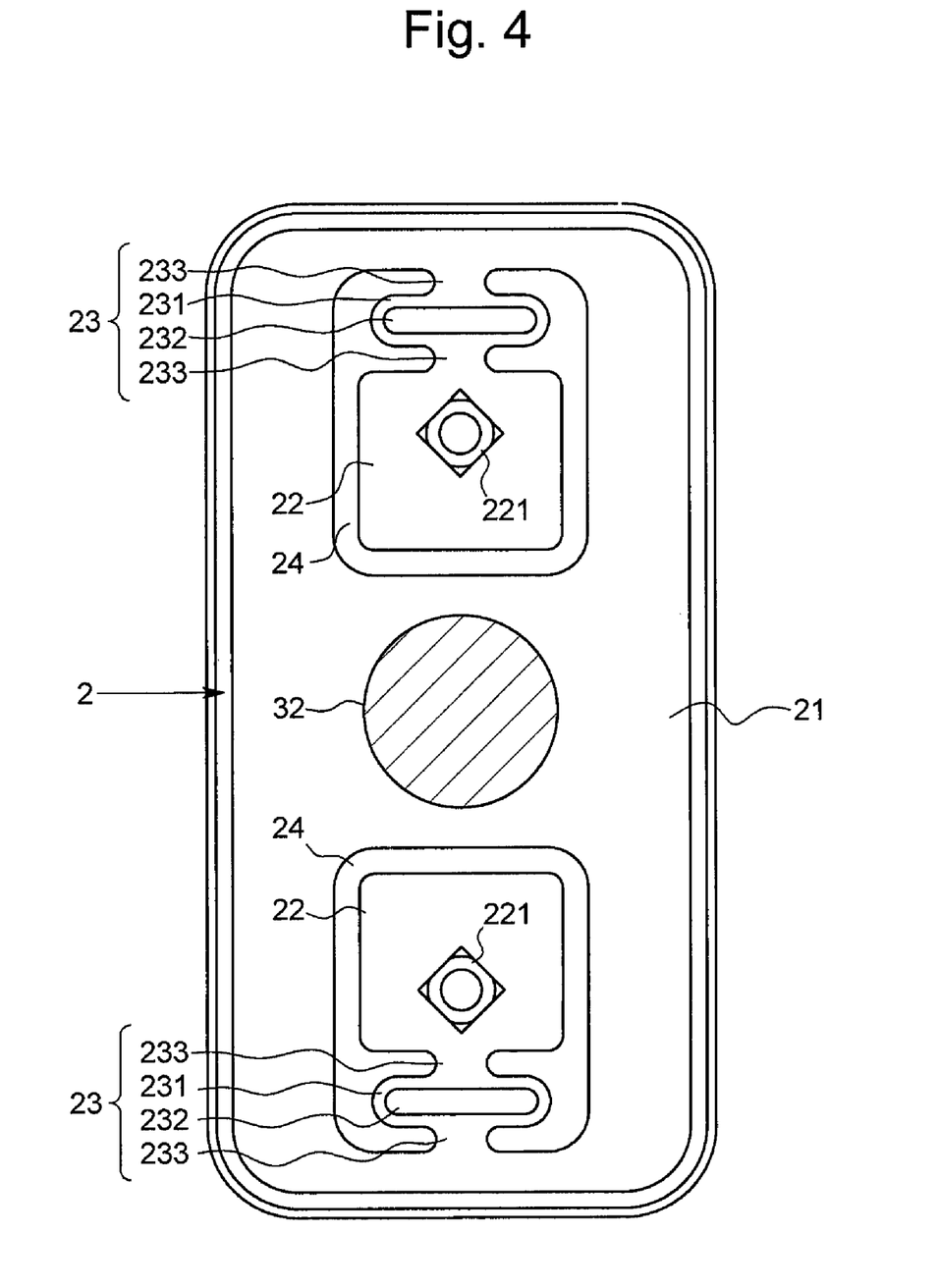
FIG. 4 is a front view illustrating a joint relation between the fastening bracket on the passenger seat side and an end of a deck cross member on the passenger seat side.
Figure 6:
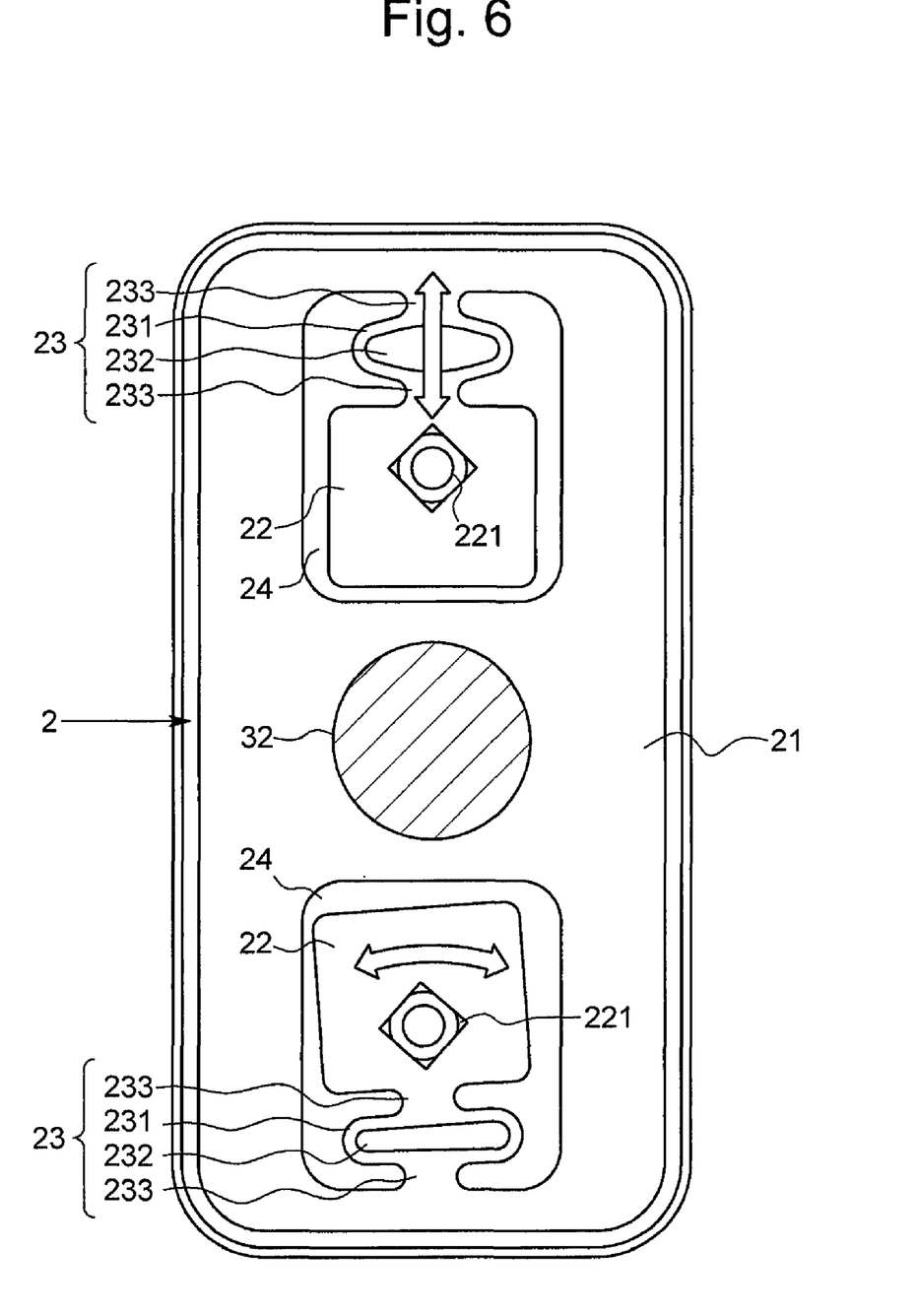
FIG. 6 is a front view of the fastening bracket on the passenger seat side corresponding to FIG. 4, illustrating a state where surface contact plates are displaced through plastic deformation of respective connection plates.

Specifically, to the fastening bracket 2 on the passenger seat side, the passenger seat side end 32 of the deck cross member 3 is joined only to the body plate 21 as illustrated in FIG. 4. Since the surface contact plate 22 is in the unrestrained state, at the passenger seat side end, the surface contact plate 22 can be close to and apart from the fitting part of the vehicle body frame 4 by elastic deformation or plastic deformation of the cross linking plates 233 or the intermediate plate 231 to adjust a gap between the surface contact plate 22 and the fitting part. Furthermore, as described below, a positional deviation between the fastening nut 221 fixed to the surface contact plate 22 and the bolt hole 41 can be eliminated by the elastic deformation or plastic deformation of the cross linking plates 233 or the intermediate plate 231 in the planner direction parallel to the fitting part. (FIG. 6). This means that the strength of the passenger seat side end 32 depends only on the rigidity of the body plate 21.

Figure 5:
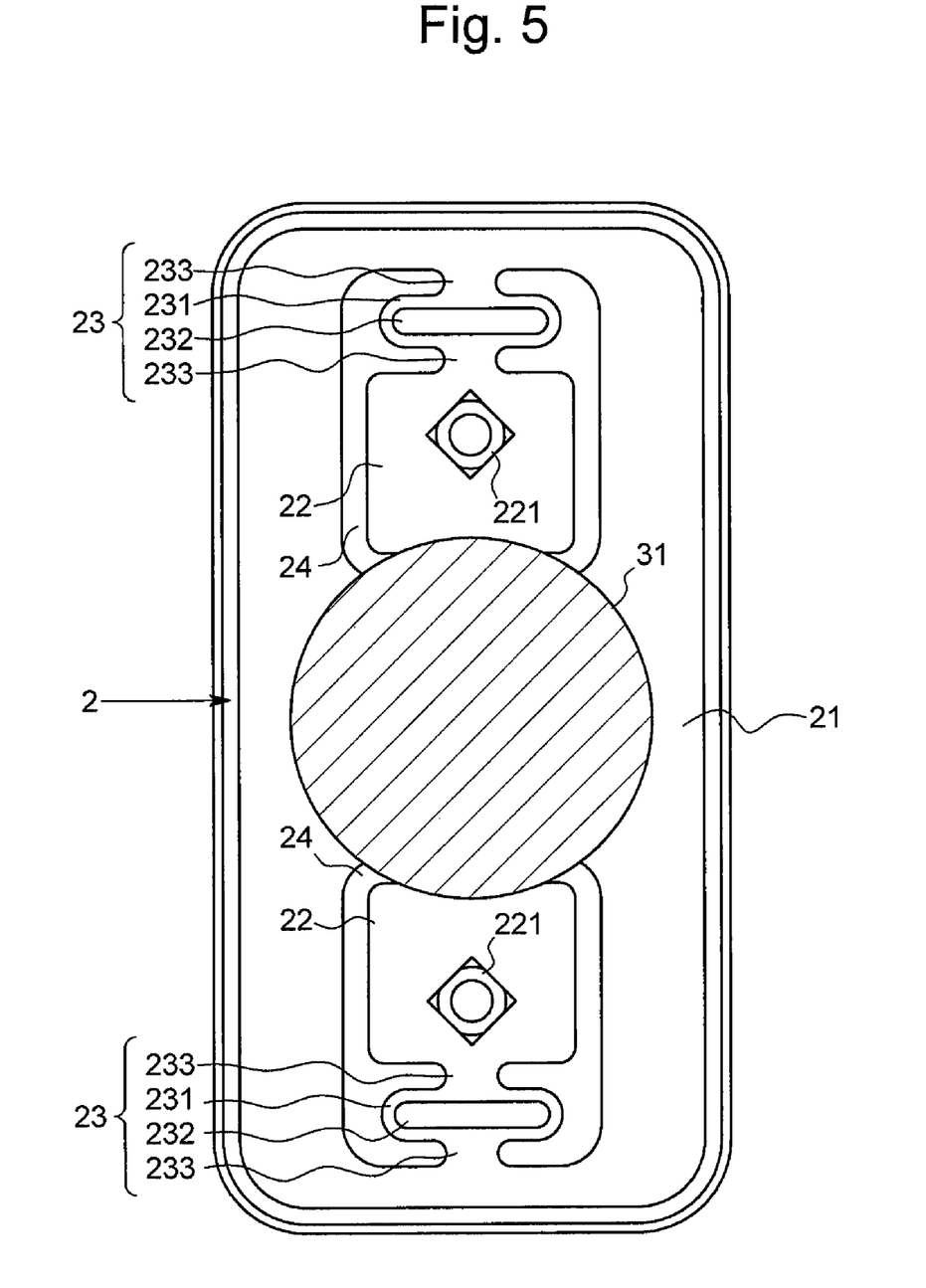
FIG. 5 is a front view illustrating a joint relation between the fastening bracket on a driver seat side and an end of the deck cross member on the driver seat side.

On the other hand, to the fastening bracket 2 on the driver seat side, the driver seat side end 31 of the deck cross member 3 is joined to both of the body plate 21 and the surface contact plate 22 as illustrated in FIG. 5. Accordingly, the above-mentioned elastic deformation or plastic deformation of the connection plate 23 is restricted, so that the surface contact plate 22 does not come close to the fitting part of the vehicle body frame 4 or displaced in the planner direction parallel to the fitting part. This is because the strength of the driver seat side end 31 is improved by the restriction of mutual deformation of the body plate 21 and the surface contact plate 22 through the driver seat side end 31, in addition to the rigidity of the body plate 21. In this manner, according to the invention, the strength of the fastening bracket 2 on the driver seat side can be increased relatively to the strength of the fastening bracket 2 on the passenger seat side while using the common right and left fastening brackets 2.

The fastening bracket 2 in this example includes the pair of surface contact plates 22 having a point symmetric positional relationship in the vertical direction. The deck cross member 3 in this example is a straight pipe having a shaft line matched on the right and left sides and having different outer diameters on the right and left sides. The deck cross member 3 has the driver seat side end 31 having a larger diameter and the passenger seat side end 32 having a smaller diameter. The outer diameter of the driver seat side end 31 is equal to or larger than the minimum distance (orthogonal distance) connecting a lower rim of the upper surface contact plate 22 and an upper rim of the lower surface contact plate 22 provided to the fastening bracket 2 on the driver seat side, and the outer diameter of the passenger seat side end 32 is smaller than the minimum distance of the surface contact plates of the fastening bracket 2 on the passenger seat side. A strength difference can be provided to the deck cross member 3 on the driver seat and passenger seat sides by setting the outer diameters of the deck cross member 3 on the driver seat and passenger seat sides as described above, and by fastening the fastening brackets 2 on the driver seat and passenger seat sides to the vehicle body frames 4 with the same laterally symmetric positional relationship. In other words, in this positional relationship, the driver seat side end 31 is welded to the body plate 21 and the surface contact plates 22 of the fastening bracket 2 on the driver seat side. On the other hand, the passenger seat side end 32 is to be welded only to the body plate 21 of the fastening bracket 2 on the passenger seat side.

As described above, the fastening brackets 2 in this example adjust a gap with the fitting part of the vehicle body frame 4 and adjust a positional deviation between the fastening nut 221 and the bolt hole 41 through the elastic deformation or plastic deformation of the connection plate 23. A conventional similar type of bracket could also adjust a gap with the fitting part of the vehicle body frame 4. The fastening brackets 2 according to the invention are advantageous in that a positional deviation between the fastening nut 221 and the bolt hole 41 can be adjusted through the elastic deformation or plastic deformation of the connection plate 23 in the planner direction parallel to the fitting part. Specifically, as illustrated in FIG. 6, the connection plate 23 displaces the surface contact plate 22 in the vertical direction by expanding the deformation slit 232 (see the upper connection plate 23 in FIG. 6) or narrowing the deformation slit 232 to deform the intermediate plate 231. Furthermore, the surface contact plate 22 is displaced in the horizontal direction with one or both of the pair of cross linking plates 233 bent (see the lower connection plate in FIG. 6). In this manner, the fastening brackets according to the invention also adjust a positional deviation between the fastening nut 221 and the bolt hole 41.

Figure 7:
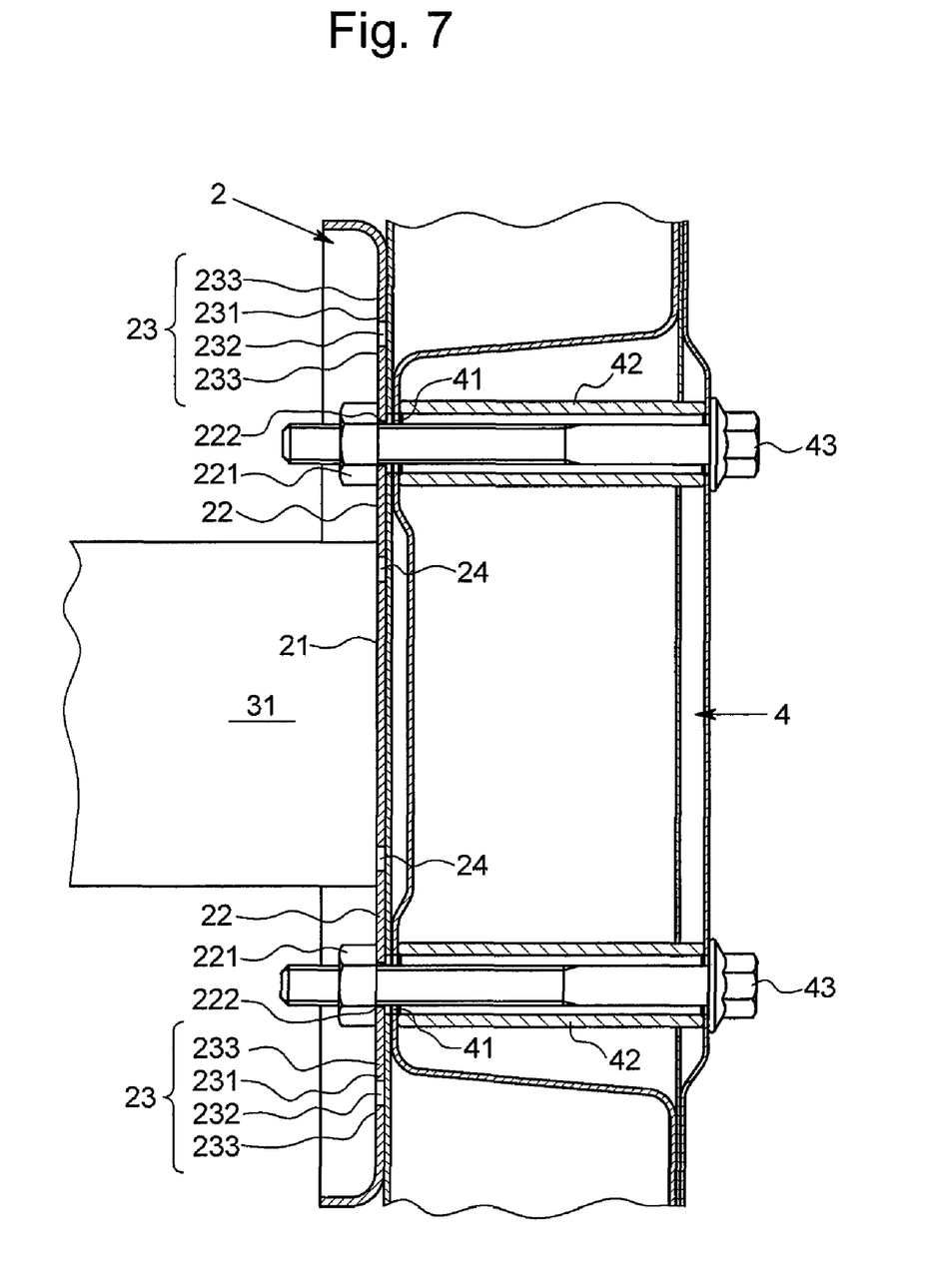
FIG. 7 is a vertical cross sectional view illustrating a state where the fastening bracket on the driver seat side has been connected to a vehicle body frame.

As illustrated in FIG. 7, on the driver seat side of the vehicle body frame 4, all of the body plate 21, the surface contact plate 22, and the connection plate 23 of the fastening bracket 2 are surface contacted with the fitting part (inner wall face of a member structuring the vehicle body frame 4), and a bolt 43 protruded through the bolt hole 41 leftward is screwed for joining into the fastening nut 221 through a spacer 42 interposed therebetween to prevent crashing. As is apparent, the connection plate 23 that is elastically deformed or plastically deformed is unnecessary for the fastening bracket 2 on the driver seat side, and the demarcating slit 24 and the connection plate 23 decrease strength. Therefore, in order to assure sufficient strength also on the driver seat side while using the common right and left fastening brackets 2, the driver seat side end 31 of the deck cross member 3 is welded astride the body plate 21 and the surface contact plate 22 in this example. This prevents lowering of the strength caused by the demarcating slit 24 and the connection plate 23 and provides a relative strength difference from the fastening bracket 2 on the passenger seat side.

Figure 8:
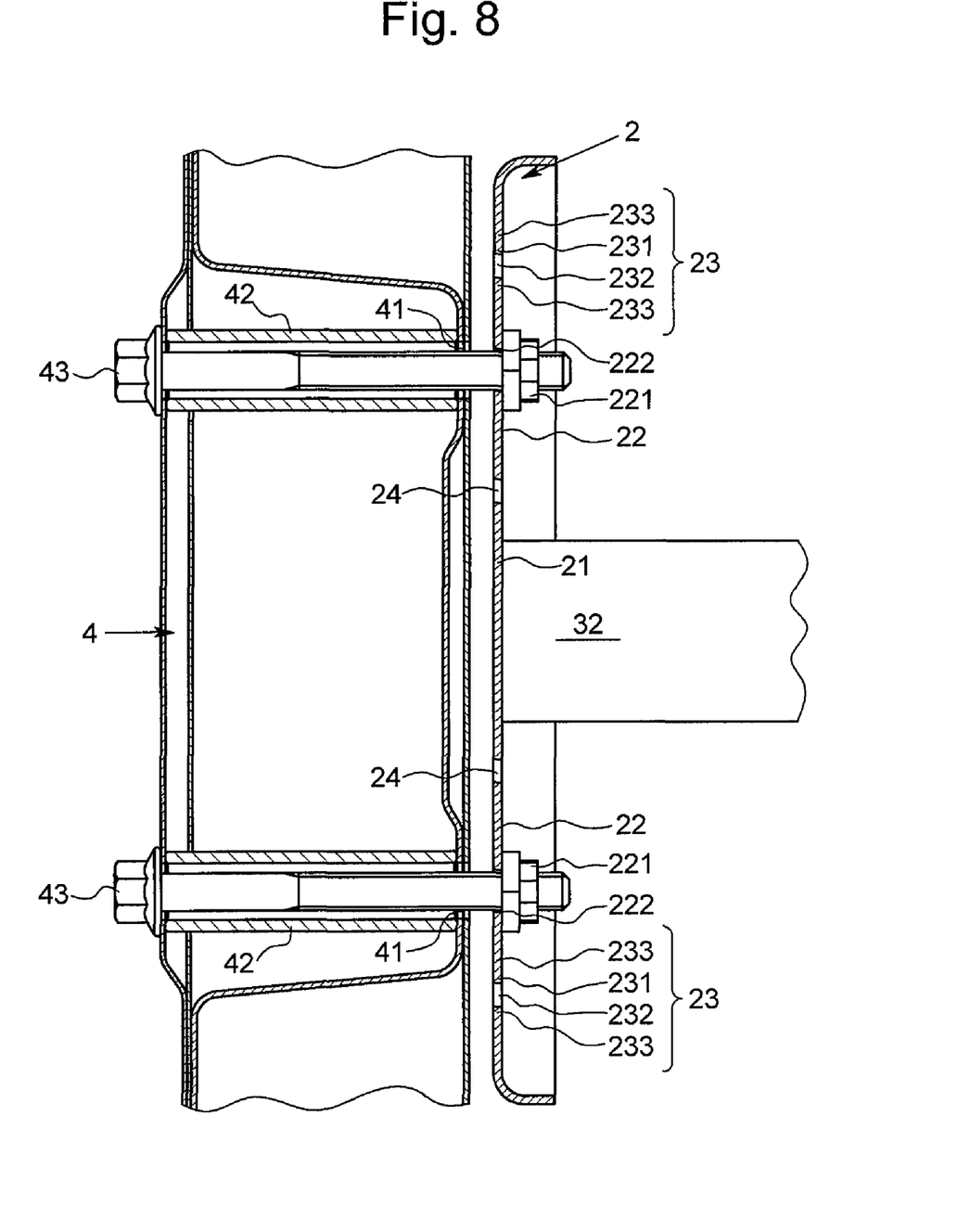
FIG. 8 is a vertical cross sectional view illustrating a state where the fastening bracket on the passenger seat side is applied to the vehicle body frame.

After the joining on the driver seat side is completed, joining on the passenger seat side follows. A positional deviation of the vehicle body frame 4 to the fitting part is adjusted on the passenger seat side of the vehicle body frame 4. The joining is performed as illustrated in FIGS. 8 and 9. First, the fastening bracket 2 is applied to the fitting part of the vehicle body frame 4 in the state where the body plate 21, the surface contact plate 22, and the connection plate 23 are aligned on a single plane. Then, the bolt 43 is inserted rightward into the through hole 222 provided to each of the upper and lower surface contact plates 22 through the spacer 42 and the bolt hole 41. Next, the bolt 43 is rotated to be engaged with the fastening nut 221. In this stage, when the positional deviation between the fastening nut 221 and the bolt hole 41 is large, the connection plate 23 deforms the intermediate plate 231 and bends the cross linking plates 233 in the planner direction parallel to the fitting part (see FIG. 6) to eliminate the positional deviation. Furthermore, when the positional deviation between the fastening nut 221 and the bolt hole 41 is small, the connection plate 23 deforms the intermediate plate 231 and bends the cross linking plates 233 in the planner direction parallel to the fitting part (see FIG. 6) to eliminate the positional deviation in a process for screwing the bolt 43 into the fastening nut 221.

When the bolt 43 engaged with the fastening nut 221 is being screwed, as illustrated in FIG. 9, since the movement of the head of the bolt 43 is restricted by the vehicle body frame 4, the fastening nut 221 begins to move to approach the vehicle body frame 4 relatively, and the surface contact plate 22 is pressed against the fitting part of the vehicle body frame 4. At this time, the surface contact plate 22 approaches the fitting part while deforming the intermediate plate 231 of the connection plate 23 and bending the cross linking plates 233 in a direction in which the surface contact plate 22 comes close to and separates from the fitting part. In this manner, the surface contact plate 22 approaches the fitting part through the elastic deformation or plastic deformation of the connection plate 23. Since the passenger seat side end 32 of the deck cross member 3 is connected to the body plate 21, the body plate 21 remains apart from the fitting part with a gap therebetween without the elastic deformation or plastic deformation of the connection plate 23. As a result, the strength of the fastening bracket 2 on the passenger seat side is relatively weakened as compared with that of the fastening bracket 2 on the driver seat side.

The invention claimed is:

1. A steering support frame formed by fastening fastening brackets attached to both right and left ends of a deck cross member to respective fitting parts provided in vehicle body frames so as to bridge the deck cross member between the right and left vehicle body frames, each of the fastening brackets comprising: a body plate to which one of the ends of the deck cross member is connected; a surface contact plate to which a fastening nut corresponding to a bolt to be inserted into corresponding one of the fitting parts of the vehicle body frames is fixed, the surface contact plate being provided in the body plate; a connection plate that is a part for connecting the body plate and the surface contact plate, the connection plate having a width in a direction perpendicular to a connecting direction of the body plate and the surface contact plate equal to or smaller than a width of the surface contact plate; and a portion defining a demarcating slit for demarcating the body plate and the surface contact plate, wherein to connect the deck cross member and the fastening brackets, one of the ends of the deck cross member is welded to both of the body plate and the surface contact plate of the fastening bracket on a driver seat side, and the other end of the deck cross member is welded only to the body plate of the fastening bracket on a passenger seat side.

2. The steering support frame according to claim 1, wherein the body plate of each of the fastening brackets includes a pair of such surface contact plates having a point symmetric positional relationship, and the deck cross member is a pipe with different diameters having one end with an outer diameter equal to or larger than a minimum distance between the pair of surface contact plates provided to the fastening bracket on the driver seat side and the other end with an outer diameter smaller than a minimum distance between the pair of surface contact plates provided to the fastening bracket on the passenger seat side.

3. The steering support frame according to claim 1, wherein in each of the fastening brackets, the connection plate is provided on a side opposite to a connecting part of the body plate to which the end of the deck cross member is connected to have a positional relationship to sandwich the surface contact plate between the body plate and the connection plate.

* * * * *